United States Patent
Li et al.

(10) Patent No.: US 8,643,643 B2
(45) Date of Patent: Feb. 4, 2014

(54) IMAGE DEPTH INFORMATION REFRESHING METHOD AND DEVICE

(75) Inventors: Chia-Chang Li, Pingtung (TW); Duan-Li Liao, Taichung (TW); Wen-Hung Ting, Guiren Township, Tainan County (TW); Po-Lung Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 533 days.

(21) Appl. No.: 12/981,649

(22) Filed: Dec. 30, 2010

(65) Prior Publication Data

US 2012/0105433 A1 May 3, 2012

(30) Foreign Application Priority Data

Oct. 29, 2010 (TW) ............................... 99137333 A

(51) Int. Cl.
*G06T 15/00* (2011.01)
(52) U.S. Cl.
USPC ........................... 345/419; 345/420; 713/320
(58) Field of Classification Search
USPC ................................. 345/419, 420; 713/320
See application file for complete search history.

(56) References Cited

U.S. PATENT DOCUMENTS

| | | | |
|---|---|---|---|
| 5,309,522 A | 5/1994 | Dye | |
| 6,862,035 B2 | 3/2005 | Jeong et al. | |
| 7,003,136 B1 | 2/2006 | Harville | |
| 7,251,346 B2 | 7/2007 | Higaki et al. | |
| 7,275,063 B2 * | 9/2007 | Horn | 1/1 |
| 7,389,432 B2 * | 6/2008 | Chandley et al. | 713/320 |
| 7,616,885 B2 | 11/2009 | Chen et al. | |

FOREIGN PATENT DOCUMENTS

| | | |
|---|---|---|
| TW | 201005673 A | 2/2010 |
| TW | 201028964 | 8/2010 |

OTHER PUBLICATIONS

English language translation of abstract of TW 201028964 (published Aug. 1, 2010).
Floriano, M.A., et al.; "Linear Complexity Stereo Matching Based on Region Indexing;" Proceedings of the XVIII Brazilian Symposium on Computer Graphics and Image Processing; 2005; pp. 1-8.
Gong, M., et al.; "Image-Gradient-Guided Real-Time Stereo on Graphics Hardware;" Proceedings of the Fifth Conference on 3-D Digital Imaging and Modeling; 2005; pp. 1-8.
Tao, T., et al.; "A Fast Block Matching Algorithm for Stereo Correspondence;" IEEE; 2008; pp. 38-41.
TW Office Action dated Jul. 13, 2013.

* cited by examiner

*Primary Examiner* — Phu K Nguyen
(74) *Attorney, Agent, or Firm* — McClure, Qualey & Rodack, LLP

(57) ABSTRACT

An image depth information refreshing method applied to an image depth information refreshing device is disclosed. The image depth information refreshing device includes a storage unit and an arithmetic logic unit. The storage unit stores a previous depth diagram corresponding to a previous image. The image depth information refreshing method includes the following steps. The arithmetic logic unit divides a current image captured by an image capturing unit into multiple image blocks. The arithmetic logic unit calculates a depth reference value of each image block according to the previous depth diagram, and determines a weight of each image block according to the depth reference values. The arithmetic logic unit determines a refreshing frequency of each image block according to the weights. The arithmetic logic unit respectively refreshes the image block according to the refreshing frequencies of the image blocks, and generates a current depth diagram corresponding to the current image.

18 Claims, 2 Drawing Sheets

|  IB(1,1) | IB(2,1) | IB(3,1) | IB(4,1) |
|---|---|---|---|
| IB(1,2) | IB(2,2) | IB(3,2) | IB(4,2) |
| IB(1,3) | IB(2,3) | IB(3,3) | IB(4,3) |
| IB(1,4) | IB(2,4) | IB(3,4) | IB(4,4) |

IMAGE DEPTH INFORMATION REFRESHING METHOD AND DEVICE

This application claims the benefit of Taiwan application Serial No. 99137333, filed Oct. 29, 2010, the subject matter of which is incorporated herein by reference.

TECHNICAL FIELD

The application relates in general to an image depth information refreshing method and device, and more particularly to an image depth information refreshing method and device capable of speeding depth computation.

BACKGROUND

Along with the rapid advance in technology, the digital content industry, which includes computer animation, digital game, digital learning, mobile application and service, also has gained rapid growth. The visual based man-machine interface system mainly captures images with camera, and further detects the user's movement or gesture through image recognition to interact with the digital content. However, the conventional single-camera interactive system may easily end up with low recognition rate due to color closeness or background interference.

Following the conventional single-camera interactive system, the dual-camera man-machine interface system is disclosed. The dual-camera man-machine interface system calculates the left and right parallax to create a depth image, not only effectively capturing the object belonging to the foreground with respect to the camera but also filtering the background interference. However, a large computation volume is required for creating the depth image, and real-time computation cannot be provided for ordinary personal computer under high resolution requirement (such as QVGA 320×240 resolution). Therefore, the dual-camera interactive system must limit the resolution level to comply with the requirement of the real-time computation. However, with the limited resolution level, the interactive system can only recognize the user's large limbs and segments (such as head and hand), but cannot provide more delicate interactive operation.

SUMMARY

The disclosure is directed to a method and a device for refreshing image depth information. Different refreshing frequencies are set to different image blocks according to the depth information so as to increase the overall efficiency in depth computation.

According to a first aspect of the present disclosure, an image depth information refreshing method applied to an image depth information refreshing device is disclosed. The image depth information refreshing device includes a storage unit and an arithmetic logic unit. The storage unit stores a previous depth diagram corresponding to a previous image. The image depth information refreshing method includes the following steps. The arithmetic logic unit divides a current image captured by an image capturing unit into multiple image blocks. The arithmetic logic unit calculates a depth reference value of each image block according to the previous depth diagram, and determines a weight of each image block according to the depth reference values. The arithmetic logic unit determines a refreshing frequency of each image block according to the weights. The arithmetic logic unit respectively refreshes the image block according to the refreshing frequencies of the image blocks, and generates a current depth diagram corresponding to the current image.

According to a second aspect of the present disclosure, an image depth information refreshing device is disclosed. The image depth information refreshing device includes a storage unit and an arithmetic logic unit. The storage unit stores a previous depth diagram corresponding to a previous image. The arithmetic logic unit divides a current image captured by an image capturing unit into multiple image blocks, calculates a depth reference value of each image block according to the previous depth diagram, and determines a weight of each image block according to the depth reference values. The arithmetic logic unit determines a refreshing frequency of each image block according to the weights, respectively refreshes the image block according to the refreshing frequencies of the image blocks, and generates a current depth diagram corresponding to the current image.

The above and other aspects of the disclosure will become better understood with regard to the following detailed description of the preferred but non-limiting embodiment(s). The following description is made with reference to the accompanying drawings.

BRIEF DESCRIPTION OF THE DRAWINGS

FIG. 3 shows an example of the current image of the image depth information refreshing method according to a preferred embodiment.

DETAILED DESCRIPTION

The disclosure discloses a method and a device for refreshing image depth information. Different refreshing frequencies are adaptively set to image blocks according to the depth information, so that the overall efficiency in depth computation is increased by way of refreshing the image blocks in a regional and non-synchronic manner.

Figure 1:
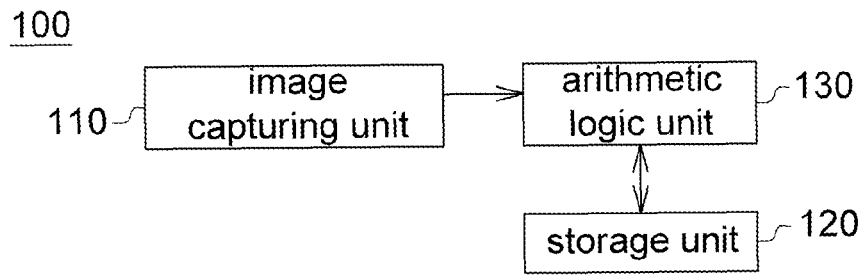
FIG. 1 shows an image depth information refreshing device according to a preferred embodiment.

Referring to FIG. 1, an image depth information refreshing device according to a preferred embodiment is shown. In FIG. 1, the image depth information refreshing device 100 includes an image capturing unit 110 (an optional element), a storage unit 120 and an arithmetic logic unit 130. The image capturing unit 110, realized by such as an internal or an external element of the image depth information refreshing device 100, is mainly used for capturing a current image for computation. The storage unit 120 stores a previous depth diagram corresponding to a previous image. The arithmetic logic unit 130 divides a current image into multiple image blocks, calculates a depth reference value of each image block according to the previous depth diagram, and determines a weight of each image block according to the depth reference values. The arithmetic logic unit 130 determines a refreshing frequency of each image block according to the weights, respectively refreshes the image block according to the refreshing frequencies of the image blocks, and generates a current depth diagram corresponding to the current image.

Figure 2:
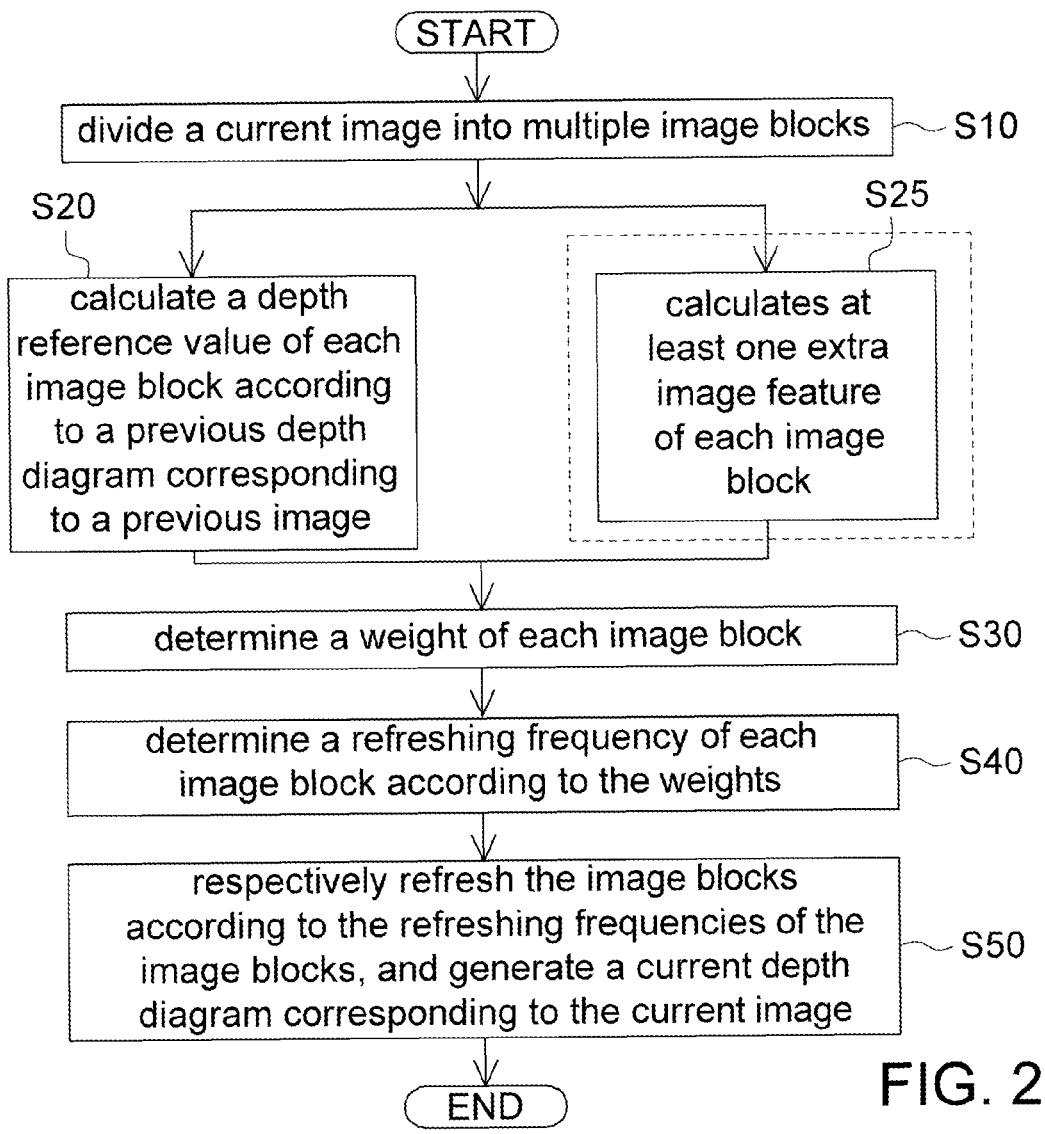
FIG. 2 shows a flowchart of an image depth information refreshing method according to a preferred embodiment.

Referring to FIG. 2, a flowchart of an image depth information refreshing method according to a preferred embodiment is shown. In step S10, the arithmetic logic unit 130 divides a current image into multiple image blocks. The current image is such as one of a plurality of consecutive left and right eye images of the parallel perspective captured by the image capturing unit 110 adopting a dual-camera system.

However, the disclosure is not limited thereto, and the image captured by the image capturing unit 110 can be realized by other images capable of creating a depth image system.

In step S20, the arithmetic logic unit 130 calculates a depth reference value of each image block according to a previous depth diagram corresponding to a previous image, wherein, a depth reference value of each image block is such as the average depth value of multiple pixels corresponding to the previous depth diagram of each image block. However, the disclosure is not limited thereto, and the arithmetic logic unit 130 can also adopt the maximum depth value, the minimum depth value or the maximum quantity depth value of multiple pixels of each image block as the depth reference value. Then, the method proceeds to step S30, a weight of each image block is determined according to the depth reference values. The image blocks with larger depth reference value can be regarded as a background region of the current image, and the image blocks with smaller depth reference value can be regarded as a foreground region of the current image, so the weights of the image blocks with larger depth reference values can be set to be smaller than the weights of the image blocks with smaller depth reference values, wherein the weight W is expressed as formula (1).

$$W = \alpha D \quad (1)$$

In addition, step S25 (not a compulsive option) can be performed after step S10, the arithmetic logic unit 130 calculates at least one extra image feature of each image block, wherein the at least one extra image feature includes skin color information, motion information, object information and edge information of each image block, and is not subjected to any specific restrictions. Thus, in step S30, the arithmetic logic unit 130 determines a weight of each image block according to at least one extra image feature of each image block in addition to the depth reference value of each image block. For example, if the referred information includes the depth reference value D, the motion information M and the skin color information S, then the weight of the image block W' can be expressed as formula (2), wherein α, β and γ denote the importance of the information:

$$W' = \alpha D + \beta M + \gamma S \quad (2)$$

In step S40, the arithmetic logic unit 130 determines a refreshing frequency of each image block according to a weight of each image block obtained in step S30. Then, in step S50, the arithmetic logic unit 130 respectively refreshes the image block according to the refreshing frequencies of the image blocks and generates a current depth diagram corresponding to the current image, wherein the current depth diagram can be used for the computation of the next image. In step S40, the criterion of determining the refreshing frequency according to the weight is not subjected to any restriction. For example, the arithmetic logic unit 130 can compare a weight of each image block with a predetermined threshold, and then classifies the image blocks whose weights are larger than the predetermined threshold (regarded as high importance/foreground region) as a real-time image sequence and classifies the image blocks whose weights are smaller than the predetermined threshold (regarded as low importance/background region) as a non-real-time image sequence. Thus, the arithmetic logic unit 130 can refresh the image blocks belonging to the real-time image sequence at a first refreshing frequency, and sequentially or randomly refresh the image blocks belonging to the non-real-time image sequence at a second refreshing frequency, wherein the first refreshing frequency is higher than the second refreshing frequency.

The disclosure is exemplified below in which a current image is divided into 4×4 image blocks, and the weight is determined according to the depth reference value only. Referring to FIG. 3, an example of the current image of the image depth information refreshing method according to a preferred embodiment is shown. In FIG. 3, the current image 300 is divided into 4×4 image blocks IB(1,1)~IB(4,4). Then, the weights W(1,1)~W(4,4) of the image blocks IB(1,1)~IB(4,4) are determined according to a depth reference value of each of the image blocks M(1,1)~M(4,4) obtained through calculation. The image blocks IB(1,1)~IB(4,4) are divided into a real-time image sequence (slashed region) and a non-real-time image sequence (non-slashed region) according to the weights W(1,1)~W(4,4).

Since the slashed region belongs to the foreground region with higher importance and the non-slashed region belongs to the background region with lower importance, the refreshing frequency of the slashed region is set to be higher than the refreshing frequency of the non-slashed region. Suppose the refreshing frequency of the slashed region equals 60 Hz, the refreshing frequency of the non-slashed region equals 10 Hz, the weights W(1,1)~W(4,4) of the image blocks IB(1,1)~IB(4,4) remain unchanged within 1/10 second, and the non-real-time image sequence is sequentially refreshed, then the image blocks refreshed within 1/10 second are illustrated in Table 1.

TABLE 1

| Time (second) | Image Blocks |
| --- | --- |
| 1/60 | IB(1, 1), IB(1, 3), IB(2, 1)~IB(2, 4), IB(3, 1)~IB(3, 2), IB(4, 1)~IB(4, 3) |
| 1/30 | IB(1, 2), IB(1, 3), IB(2, 1)~IB(2, 4), IB(3, 1)~IB(3, 2), IB(4, 1)~IB(4, 3) |
| 1/20 | IB(1, 4), IB(1, 3), IB(2, 1)~IB(2, 4), IB(3, 1)~IB(3, 2), IB(4, 1)~IB(4, 3) |
| 1/15 | IB(3, 3), IB(1, 3), IB(2, 1)~IB(2, 4), IB(3, 1)~IB(3, 2), IB(4, 1)~IB(4, 3) |
| 1/12 | IB(3, 4), IB(1, 3), IB(2, 1)~IB(2, 4), IB(3, 1)~IB(3, 2), IB(4, 1)~IB(4, 3) |
| 1/10 | IB(4, 4), IB(1, 3), IB(2, 1)~IB(2, 4), IB(3, 1)~IB(3, 2), IB(4, 1)~IB(4, 3) |

As indicated in Table 1, the image blocks IB(1,3), IB(2,1)~IB(2,4), IB(3,1)~IB(3,2), IB(4,1)~IB(4,3) will all be refreshed every 1/60 second, but only one of the image blocks IB(1,1), IB(1,2), IB(1,4), IB(3,3), IB(3,4), IB(4,4) will be sequentially refreshed. That is, the multiple image blocks of the real-time refreshing sequence are all refreshed every time, but only a part of the multiple image blocks of the non-real-time refreshing sequence is sequentially refreshed.

Similarly, suppose the refreshing frequency of the slashed region equals 60 Hz, the refreshing frequency of the non-slashed region equals 10 Hz, the weights W(1,1)~W(4,4) of the image blocks IB(1,1)~IB(4,4) remain unchanged within 1/10 second, and the non-real-time image sequence is randomly refreshed, then the image blocks refreshed within 1/10 second are illustrated in Table 2.

TABLE 2

| Time (second) | Image Blocks |
| --- | --- |
| 1/60 | IB(3, 3), IB(1, 3), IB(2, 1)~IB(2, 4), IB(3, 1)~IB(3, 2), IB(4, 1)~IB(4, 3) |
| 1/30 | IB(1, 4), IB(1, 3), IB(2, 1)~IB(2, 4), IB(3, 1)~IB(3, 2), IB(4, 1)~IB(4, 3) |
| 1/20 | IB(4, 4), IB(1, 3), IB(2, 1)~IB(2, 4), IB(3, 1)~IB(3, 2), IB(4, 1)~IB(4, 3) |
| 1/15 | IB(1, 1), IB(1, 3), IB(2, 1)~IB(2, 4), IB(3, 1)~IB(3, 2), |

TABLE 2-continued

| Time (second) | Image Blocks |
|---|---|
| 1/12 | IB(4, 1)~IB(4, 3)<br>IB(1, 2), IB(1, 3), IB(2, 1)~IB(2, 4), IB(3, 1)~IB(3, 2), IB(4, 1)~IB(4, 3) |
| 1/10 | IB(3, 4), IB(1, 3), IB(2, 1)~IB(2, 4), IB(3, 1)~IB(3, 2), IB(4, 1)~IB(4, 3) |

As indicated in Table 2, the image blocks IB(1,3), IB(2,1)~IB(2,4), IB(3,1)~IB(3,2), IB(4,1)~IB(4,3) will all be refreshed every 1/60 second, but only one of the image blocks IB(1,1), IB(1,2), IB(1,4), IB(3,3), IB(3,4), IB(4,4) will be randomly refreshed. That is, the multiple image blocks of the real-time refreshing sequence are refreshed every time, but only a part of the multiple image blocks of the non-real-time refreshing sequence is randomly refreshed.

The images of an ordinary man-machine interactive system can be divided into user regions (foreground regions) and non-user regions (background regions). When the image depth information refreshing method of the disclosure is adopted, with regard to the characteristics of continuous image in the time domain, the computation of the image depth information can be focused more on the depth information of the user region, and the computation volume of the depth information of the region with less importance (such as the background region) in the time domain can be reduced, so as to speed depth computation and increase the overall efficiency in depth computation.

The disclosure discloses a method and a device for refreshing image depth information. Unlike the conventional method for creating the depth of image sequence, the method of the disclosure divides an image into multiple image blocks, and determines the weights of the image blocks according to the depth information and other image features to adaptively set different refreshing frequencies to different image blocks, so that the region of interest is refreshed at higher frequency, and the computation volume of the depth of less important region is decreased. Thus, the image depth information refreshing method and device of the disclosure increases the overall efficiency in depth computation by refreshing the image blocks in a regional and non-synchronic manner, and provides high quality and real-time depth image to the visual-type man-machine interactive system, so that the visual-type man-machine interactive system can recognize more delicate body motions.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image depth information refreshing method applied to an image depth information refreshing device, wherein the image depth information refreshing device comprises a storage unit and an arithmetic logic unit, the storage unit stores a previous depth diagram corresponding to a previous image, and the image depth information refreshing method comprises:
   dividing a current image into a plurality of image blocks by the arithmetic logic unit, wherein the current image is captured by an image capturing unit;
   calculating a depth reference value of each image block according to the previous depth diagram and determining a weight of each image block according to the depth reference values by the arithmetic logic unit;
   determining a refreshing frequency of each image block according to the weights by the arithmetic logic unit; and
   respectively refreshing the image blocks according to the refreshing frequencies of the image blocks and generating a current depth diagram corresponding to the current image by the arithmetic logic unit.

2. The image depth information refreshing method according to claim 1, wherein the current image is one of a plurality of consecutive left and right eye images of the parallel perspective captured by the image capturing unit.

3. The image depth information refreshing method according to claim 1, wherein the arithmetic logic unit calculates an average depth value, a maximum depth value, a minimum depth value or a maximum quantity depth value of a plurality of pixels corresponding to the previous depth diagram of each image block as the depth reference value of each image block.

4. The image depth information refreshing method according to claim 1, wherein the weights of the image blocks with larger depth reference values are smaller than the weights of the image blocks with smaller depth reference values.

5. The image depth information refreshing method according to claim 1, wherein the step of determining the refreshing frequency comprises:
   comparing a predetermined threshold with the weights by the arithmetic logic unit to divide the image blocks into a real-time image sequence and a non-real-time image sequence; and
   setting the refreshing frequency of the image blocks belonging to the real-time image sequence as a first refreshing frequency and setting the refreshing frequency of the image blocks belonging to the non-real-time image sequence as a second refreshing frequency by the arithmetic logic unit, wherein the first refreshing frequency is higher than the second refreshing frequency.

6. The image depth information refreshing method according to claim 5, wherein the arithmetic logic unit sequentially refreshes the image blocks belonging to the non-real-time image sequence at the second refreshing frequency.

7. The image depth information refreshing method according to claim 5, wherein the arithmetic logic unit randomly refreshes the image blocks belonging to the non-real-time image sequence at the second refreshing frequency.

8. The image depth information refreshing method according to claim 1, wherein the step of determining the weight of each image block further comprises:
   determining the weight of each image block by the arithmetic logic unit according to at least one extra image feature of each image block in addition to the depth reference values.

9. The image depth information refreshing method according to claim 8, wherein the at least one extra image feature comprises skin color information, motion information, object information or edge information of each image block.

10. An image depth information refreshing device, comprising:
   a storage unit used for storing a previous depth diagram corresponding to a previous image; and
   an arithmetic logic unit used for dividing a current image captured by an image capturing unit into a plurality of image blocks, calculating a depth reference value of each image block according to the previous depth diagram, and determining a weight of each image block according to the depth reference values;

wherein the arithmetic logic unit a determines a refreshing frequency of each image block according to the weights, respectively refreshes the image blocks according to the refreshing frequencies of the image blocks, and generates a current depth diagram corresponding to the current image.

11. The image depth information refreshing device according to claim 10, wherein the current image is one of a plurality of consecutive left and right eye images of the parallel perspective captured by the image capturing unit.

12. The image depth information refreshing device according to claim 10, wherein the arithmetic logic unit calculates an average depth value, a maximum depth value, a minimum depth value or a maximum quantity depth value of a plurality of pixels corresponding to the previous depth diagram of each image block as the depth reference value of each image block.

13. The image depth information refreshing device according to claim 10, wherein the weights of the image blocks with larger depth reference values are smaller than the weights of the image blocks with smaller depth reference values.

14. The image depth information refreshing device according to claim 10, wherein the arithmetic logic unit compares a predetermined threshold with the weights to divide the image blocks into a real-time image sequence and a non-real-time image sequence, sets the refreshing frequency of the image blocks belonging to the real-time image sequence as a first refreshing frequency and sets the refreshing frequency of the image blocks belonging to the non-real-time image sequence as a second refreshing frequency, and the first refreshing frequency is higher than the second refreshing frequency.

15. The image depth information refreshing device according to claim 14, wherein the arithmetic logic unit sequentially refreshes the image blocks belonging to the non-real-time image sequence at the second refreshing frequency.

16. The image depth information refreshing device according to claim 14, wherein the arithmetic logic unit randomly refreshes the image blocks belonging to the non-real-time image sequence at the second refreshing frequency.

17. The image depth information refreshing device according to claim 10, wherein the arithmetic logic unit determines the weight of each image block according to at least one extra image feature of each image block in addition to the depth reference values.

18. The image depth information refreshing device according to claim 17, wherein the at least one extra image feature comprises skin color information, motion information, object information or edge information of each image block.

* * * * *